US008646697B1

(12) United States Patent
DePrisco et al.

(10) Patent No.: US 8,646,697 B1
(45) Date of Patent: Feb. 11, 2014

(54) SELF LOCKING TAGGING SYSTEM

(75) Inventors: Joseph G. DePrisco, Fort Wayne, IN (US); Richard L. Raber, Woodburn, IN (US); Michael A. Gigli, Fort Wayne, IN (US)

(73) Assignee: Northern Apex Corporation, Fort Wayne, IN (US)

( * ) Notice: Subject to any disclaimer, the term of this patent is extended or adjusted under 35 U.S.C. 154(b) by 314 days.

(21) Appl. No.: 13/068,547

(22) Filed: May 13, 2011

(51) Int. Cl.
*G06K 19/00* (2006.01)
(52) U.S. Cl.
USPC ........................................... 235/492; 235/487
(58) Field of Classification Search
USPC .............................. 235/487, 492; 340/10, 572
See application file for complete search history.

(56) References Cited

U.S. PATENT DOCUMENTS

| 5,947,524 | A | * | 9/1999 | Podosek | ........................ | 281/45 |
| 2005/0194442 | A1 | | 9/2005 | Adams | | |
| 2008/0165015 | A1 | | 7/2008 | Forster | | |
| 2008/0283601 | A1 | | 11/2008 | Murauka | | |
| 2009/0160653 | A1 | * | 6/2009 | Yeh et al. | ................... | 340/572.7 |
| 2010/0045437 | A1 | | 2/2010 | Hioki | | |

* cited by examiner

*Primary Examiner* — Michael G Lee
*Assistant Examiner* — Matthew Mikels
(74) *Attorney, Agent, or Firm* — Taylor IP, P.C.

(57) ABSTRACT

An RFID tag supported on a carrier self locks to a work piece. The work piece, such as a beam, is modified to form an elongated slot in the beam having an opening along one face of the beam. A slip located is located in the elongated slot, the slip being bent on a fold following an axis generally parallel to the direction of elongation of the elongated slot and formed so that the slip retains a degree of spring force urging a pair of edges of the slip against interior major faces of the elongated slot. The slip is oriented in the elongated slot with the fold relatively away from the opening relative to the pair of edges so that at least one of the pair of edges catches on one of the interior major faces. The fold defines first and second sections of the slip on opposed sides of the fold, the first section forming a base section which carries a radio frequency identification tag and the second section forming a latch section, which is narrower than the base section.

12 Claims, 4 Drawing Sheets

SELF LOCKING TAGGING SYSTEM

BACKGROUND

1. Technical Field

The present disclosure relates generally to tagging work pieces in a production setting and more particularly to locating a radio identification (RFID) tag in the work pieces during assembly operations where an RFID tag carrier cooperates with a given work piece to self lock in position on the work piece.

2. Description of the Problem

RFID tags provide storage of data which can be interrogated by readers without contact. RFID tags, also known as inlays, are commonly employed in numerous manufacturing settings where they can be applied to a work piece allowing the work piece to be electronically tracked through production to completion of a finished article. An RFID tag associated with a work piece may include instructions on modifications of a particular example of a product into which the work piece is to be incorporated as well as store data for inventory control.

Of interest is the secure application of an RFID tag to a work piece. Conventionally RFID tags are implanted in a polyester film (popularly termed "Mylar," a trademark) and applied to a carrier, a long strip of a matrix which may be paper, plastic or other types of material. Numerous individual tags are placed on the carrier which is wound on a reel for distribution. At the production site the reel is unwound exposing individual tags which can be peeled off the carrier and applied to the work piece, sometimes after application of an adhesive if not already present. So used, the tags are sometimes subject to dislodgement or damage. The carrier is typically discarded.

SUMMARY

A work piece such as a beam incorporates an elongated slot or other hole having an opening along one face of the beam. A slip is inserted into the elongated slot, or other hole, the slip being bent on a fold following an axis generally parallel to the direction of elongation of the elongated slot and formed so that the slip retains a degree of spring force urging a pair of edges of the slip against interior major faces of the elongated slot. The slip is oriented in the elongated slot with the fold relatively away from the opening relative to the pair of edges so that at least one of the pair of edges catches on one of the interior major faces and the slot constricts unfolding of the slip. The fold defines first and second sections of the slip on opposed sides of the fold, the first section forming a base section which carries a radio frequency identification tag and the second section forming a latch section, which is narrower than the base section.

DETAILED DESCRIPTION

Figure 1:
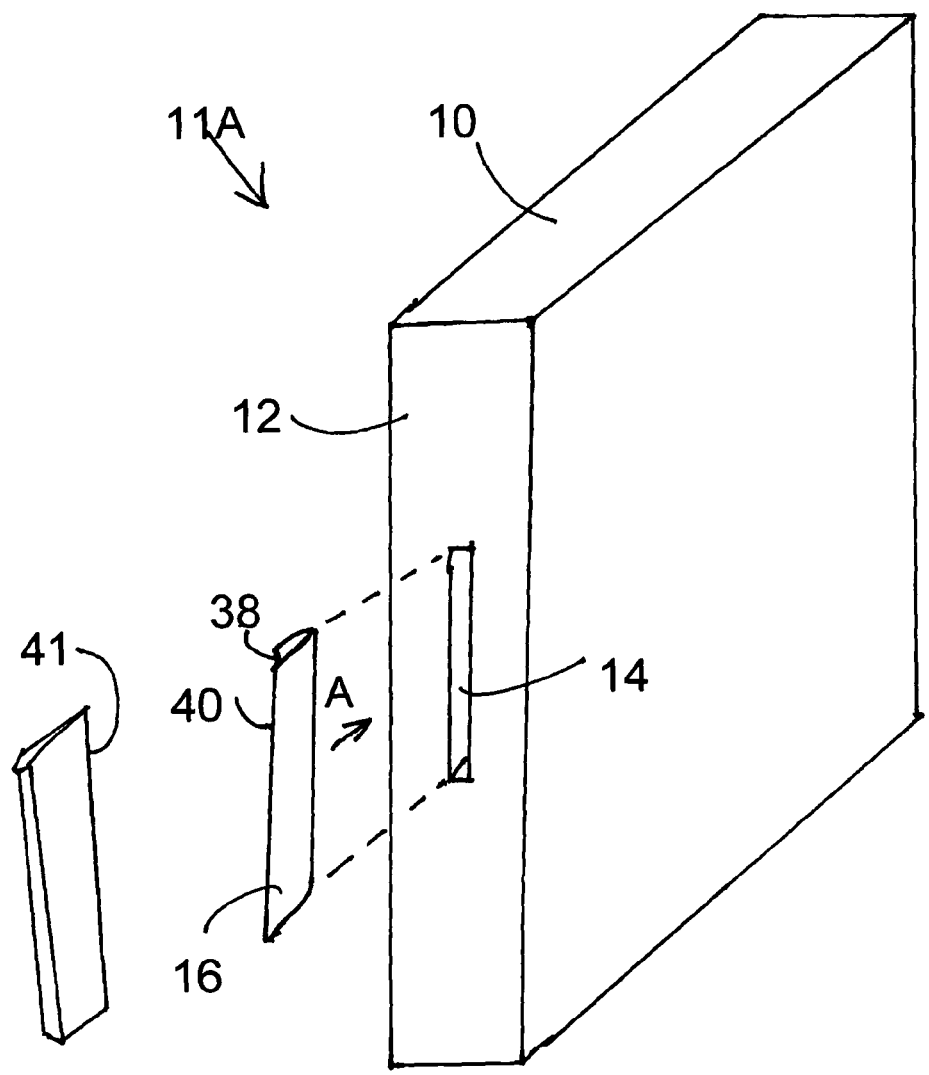
FIG. 1 is a perspective view of a work piece illustrating the direction of insertion of a folded slip bearing an RFID tag.
Figure 2:
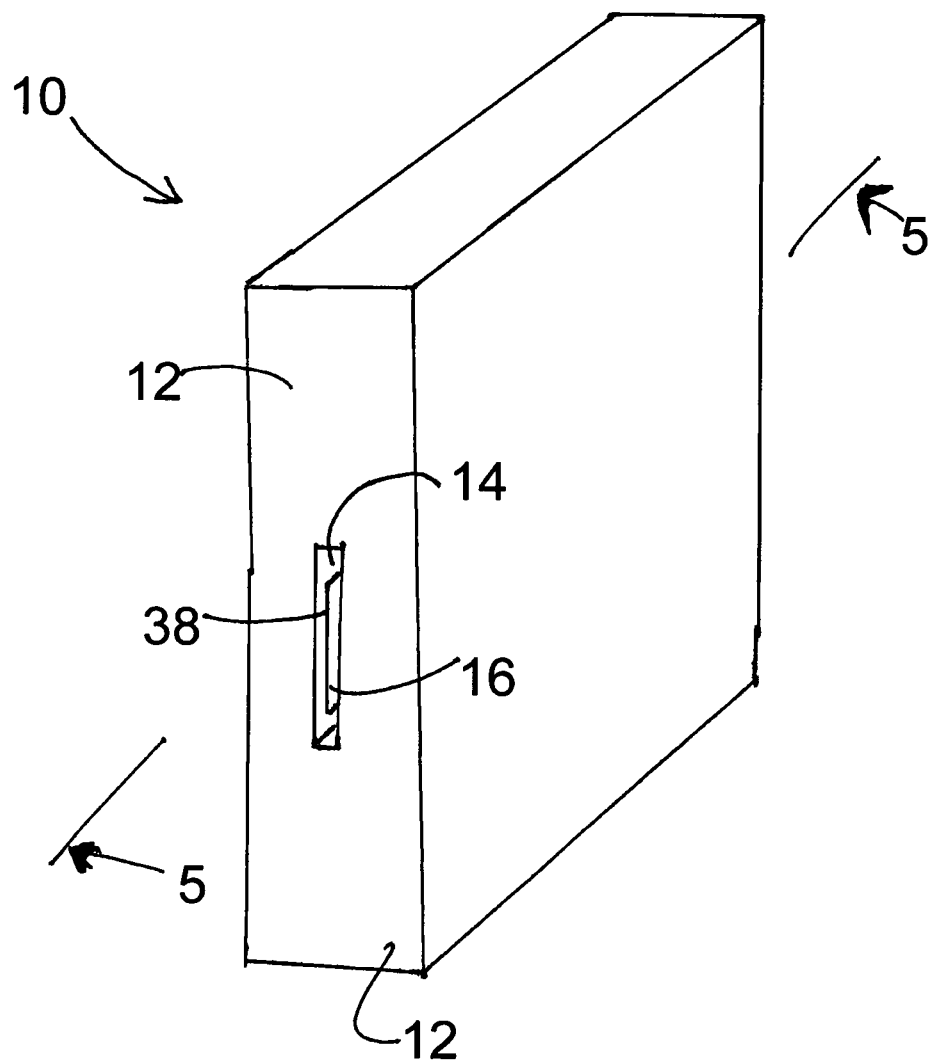
FIG. 2 is a perspective view of a work piece with an inserted slip.
Figure 5:
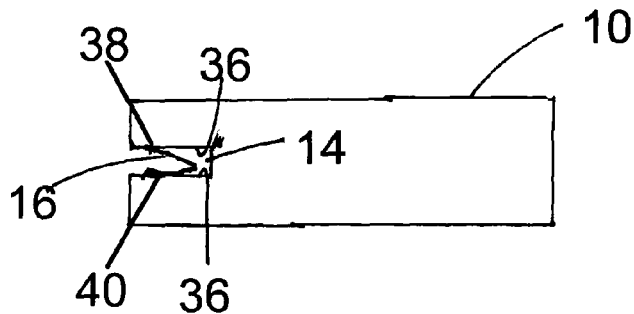
FIG. 5 is a cross sectional view of a beam taken along section lines 5-5 of FIG. 2.

Referring now to the figures, FIGS. 1 and 2 are perspective views of a beam 10 of work piece 11A into which a elongated slot or mortise 14 has been formed along one edge face 12. Beam 10 is generally a work piece such as dimensioned lumber, fiber board or a piece of composite material. A folded slip 16 may be inserted "fold first" through the open face of slot 14 and into the slot in the direction indicated by arrow A in FIG. 1. They axis of the fold is generally parallel to direction of elongation of the elongated slot 14 or hole. The breadth of either section of folded slip 16 is greater than the width of the elongated slot 14, and the fold in folded slip 16 is uncreased so that opposed edges 38, 40 of the elongated slip are urged against interior major faces 36 (see FIG. 5) of the elongated slot 14 by spring force generated by the slip. The fold is located deeper in the slot 14 and further away from the open face of the slot than edges 38 and 40. In order to retain a sufficient degree of spring force in the slip the allowable maximum width of the elongated slot 14 will depend upon the weight or thickness of the carrier matrix and the material it is made from. In practice, paper is often used on the carrier. For the paper used with distribution of RFID tags a slot 14 having a width of up to about one eighth of an inch works to retain the slip 16 after insertion without the use of adhesives, though a more usual width is one sixteenth of an inch. Generally slots 14 are kept to a minimum width to avoid weakening of the beam 10. For insertion a knife edge 41 may be positioned between the folds of slip 16 and used to push the slip into slot 14. Those skilled in the art will now realize that alternative recesses to slots 14 may be possible under some circumstances. For example a bore hole may be used which allows a folded RFID tag on a section of carrier to be inserted.

Figure 3:
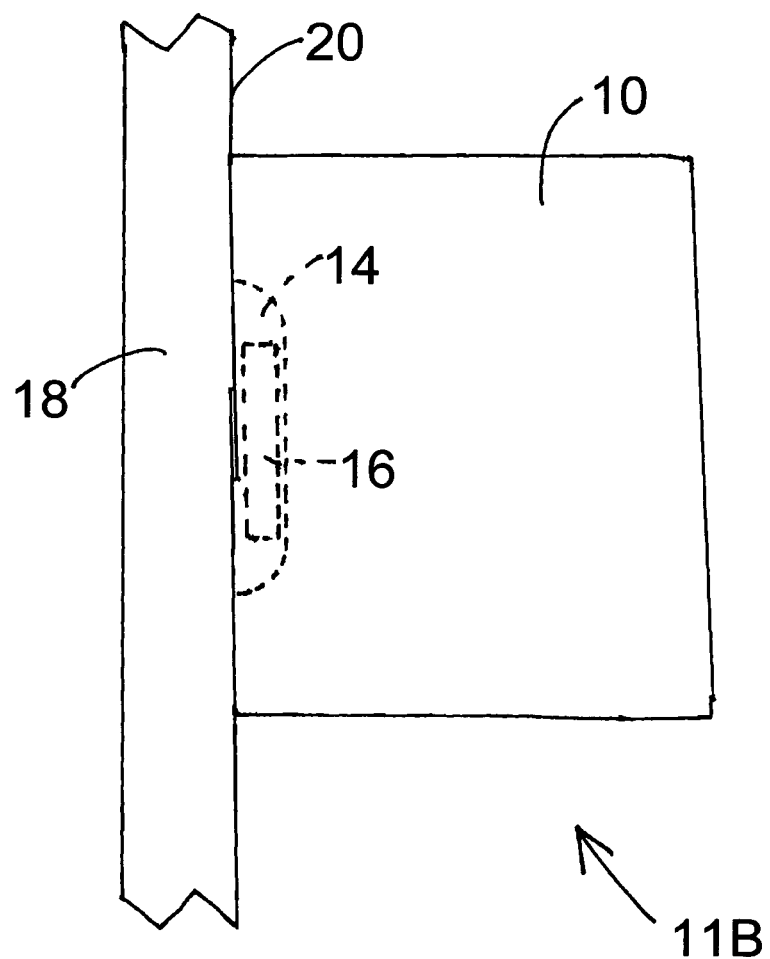
FIG. 3 is a side elevation of a work piece illustrating location of an inserted slip.

FIG. 3 illustrates location of the elongated slip 16 in elongated slot 14 with the open face closed by a face 20 of a second beam 18. This construction forms a follow on work piece 11B.

Figure 4:
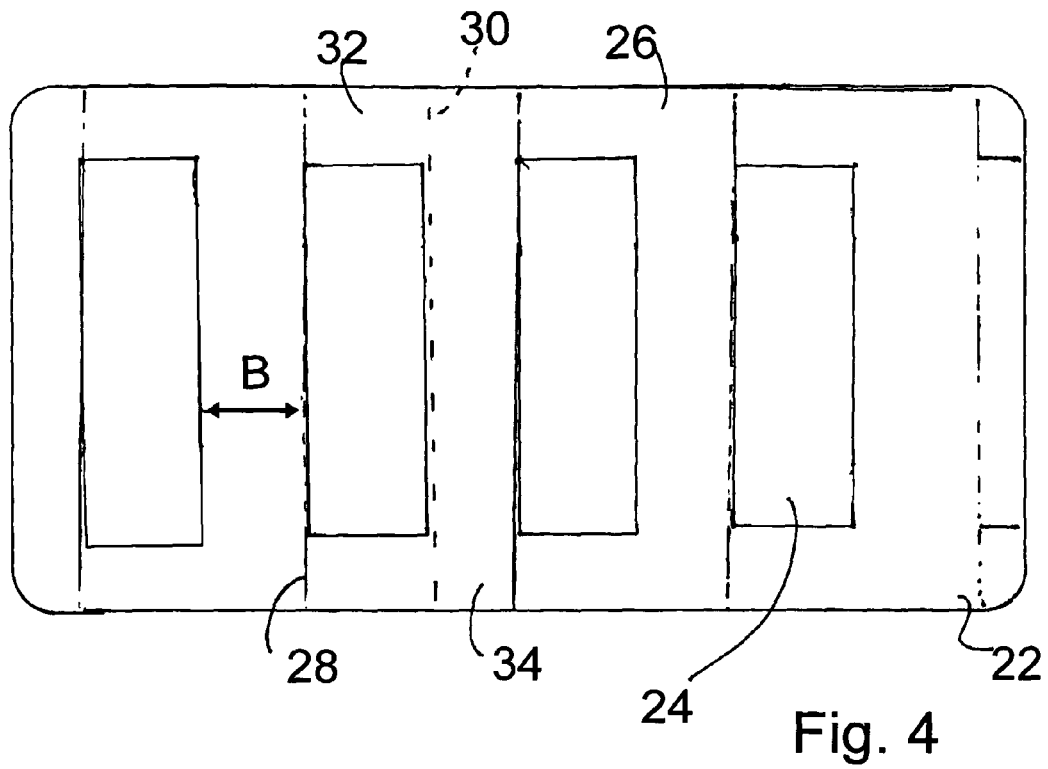
FIG. 4 illustrates a tape of carrier paper to which RFID tags have been applied.

Folded slips 16 are formed by processing of a distribution tape 22 for RFID tags 24. As shown in FIG. 4, distribution tape 22 is largely conventional comprising a bed of carrier paper 26 on which areas of polyester film corresponding to the RFID tags 24 have been formed. The distribution tape 22 varies from conventional practice in that the RFID tags 24 are spaced from one another by a distance indicated by the double arrow "B." A spacing corresponding to about one and one-half the width of the intended slot 14 works well for formation of slips for some carrier materials. However, this will change depending upon the type of material used. Cut lines 28 may be embossed on the carrier running along one edge of each of the RFID tags 24. The opposite edges of the RFID tags 24 are adjacent a fold zone 30.

Figure 6:
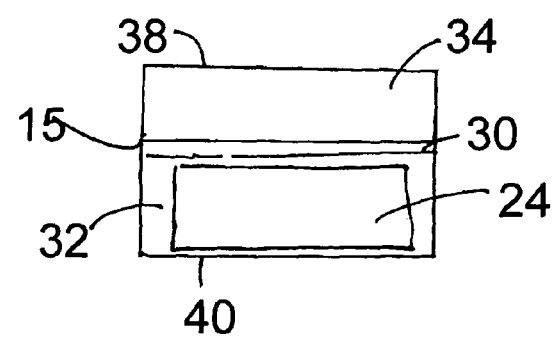
FIG. 6 is a plan view of a slip.

The product of cutting distribution tape 22, an unfolded slip 15, is shown in FIG. 6. Unfolded slip 15 is rectangular in shape with opposite edges 38 and 40. The RFID tag 24 is located on what will be the first fold or section, here termed the base section 32. A fold zone 30 runs through the slip 15 parallel to RFID tag 24 but usually somewhat off center relative to the edges 38 and 40, being somewhat closer to edge 38. Fold zone 30 divides the base section 32 from a second section/fold or "latch" section 34. Having the fold zone 30 off center tends to result in edges 38 and 40 having different angles of incidence against the major interior faces 36 of slot 14 after insertion of the folded slip 16 into the slot (see FIG. 5).

Upon insertion of folded slip 16 into slot 14 the folded slip is retained in the slot by impingement of edges 38, 40 against the interior major faces 36 of the slot. At least one of edges 38,

40 will bite against its respective interior major face along an angle to provide reactive force against conventional forces encountered in manufacturing which would tend to dislodge the slip helping to retain the slip in position until such time as the opening is covered.

The disclosed process dispenses with removal of RFID tags from carrier paper and instead retains the tags on the carrier. The carrier can be cut into "springy slips" which can be lodged in a slot cut in a work piece such as wood or other material including composites. This places the RFID tag in a location where it is protected against mechanical damage and dislodgement and dispenses with any need for adhesives to keep the tag in place on the wood/composite.

What is claimed is:

1. A self locking tag system comprising:
   a beam having an exterior face;
   a recess in the beam from the exterior face, the recess having at least a first major interior surface;
   a generally rectangular slip having a fold from one edge to an opposed edge;
   the fold defining first and second sections of the slip on either side of the fold with both the first and second sections being of greater width than the width of the recess; and
   the slip being fully inserted fold first into the recess with the first and second sections trailing the fold and expanding outwardly to impinge against and catch edgewise on the at least first major interior face of the recess.

2. The self locking tag system of claim 1, further comprising:
   the first and second sections of the slip corresponding to a base section which carries a radio frequency identification tag and to a latch section, respectively, with the latch section being narrower than the base section.

3. A self locking tag system as claimed in claim 2, further comprising:
   the slip being made of carrier paper with the fold being uncreased to allow the slip to function as a torsion spring urging the latch and base sections relatively outwardly against the at least first major interior face or faces of the recess.

4. A self locking tag system as claimed in claim 3, further comprising:
   a second beam closing the recess to form a work piece in an assembly operation.

5. A self locking tag system as claimed in claim 3, further comprising:
   the slip being cut from a tape carrying a plurality of radio identification tags transversely disposed thereon.

6. A self locking tag system as claimed in claimed 3, further comprising:
   the latch section having a width which is one and one half times that of the recess.

7. A work piece comprising:
   a beam;
   an elongated slot in the beam having an opening along one face of the beam, the slot being defined by facing interior major faces in the beam;
   a slip located in the elongated slot, the slip being bent on a fold following an axis generally parallel to the direction of elongation of the elongated slot and formed so that the slip retains a degree of spring force urging a pair of edges of the slip against the facing interior major faces of the elongated slot; and
   the slip being oriented in the elongated slot with the fold relatively away from the opening relative to the pair of edges so that at least one of the pair of edges catches on one of the interior major faces.

8. The work piece of claim 7, further comprising:
   first and second sections of the slip on opposed sides of the fold, the first section forming a base section which carries a radio frequency identification tag and the second section forming a latch section, which is narrower than the base section.

9. The work piece of claim 8, further comprising:
   the slip being cut from a tape of carrier paper carrying a plurality of radio identification tags transversely disposed thereon.

10. The work piece of claim 9, further comprising:
    the latch section having a width which is one and one half times the width of the elongated slot.

11. The work piece of claim 8, further comprising:
    an element applied to the beam closing the elongated slot.

12. A process for tagging work pieces, the process comprising the steps of:
    providing a work piece;
    forming an elongated slot in the work piece having an opening along one face of the work piece and having interior opposite major faces;
    providing a plurality of radio identification tags on a tape of carrier paper, with the radio identification tags spaced from one another on the tape by at least the width of the elongated slot;
    cutting elongated slips from the tape including a radio identification tag, the radio identification tags being located along an elongated edge of the slip to leave a substantial section of the slip along an opposite elongated edge uncovered;
    inserting the slips into elongated slots with each slip being bent on a fold following an axis generally parallel to the direction of elongation of the elongated slot so that the slip retains a degree of spring force urging a pair of edges of the slip outwardly against the interior opposite major faces of the elongated slot; and
    the slip being oriented in the elongated slot with the fold relatively away from the opening relative to the pair of edges.

* * * * *